Sept. 30, 1969   R. C. BRACKEN ET AL   3,470,069
TEMPERATURE CONTROL OF A PROCESSING ZONE BY SENSING
AND AVERAGING SEPARATE TEMPERATURES
Filed April 22, 1968

INVENTORS
R.C. BRACKEN
E.D. LEA
BY
*Young and Quigg*
ATTORNEYS

United States Patent Office 3,470,069
Patented Sept. 30, 1969

3,470,069
TEMPERATURE CONTROL OF A PROCESSING ZONE BY SENSING AND AVERAGING SEPARATE TEMPERATURES
Robert C. Bracken and Eugene D. Lea, Bartlesville, Okla., assignors to Phillips Petroleum Company, a corporation of Delaware
Filed Apr. 22, 1968, Ser. No. 722,998
Int. Cl. B01d 3/42
U.S. Cl. 203—2                                    12 Claims

ABSTRACT OF THE DISCLOSURE

Method and apparatus for maintaining the temperature of a fluid in a first zone substantially constant by averaging (1) the temperature of a fluid in said first zone and (2) the temperature of fluid from said first zone prior to its entry into a heat transfer zone, and employing the resulting averaged temperature as a control temperature for the addition of heat to or the withdrawal of heat from said fluid in said heat transfer zone.

---

Figure 1:
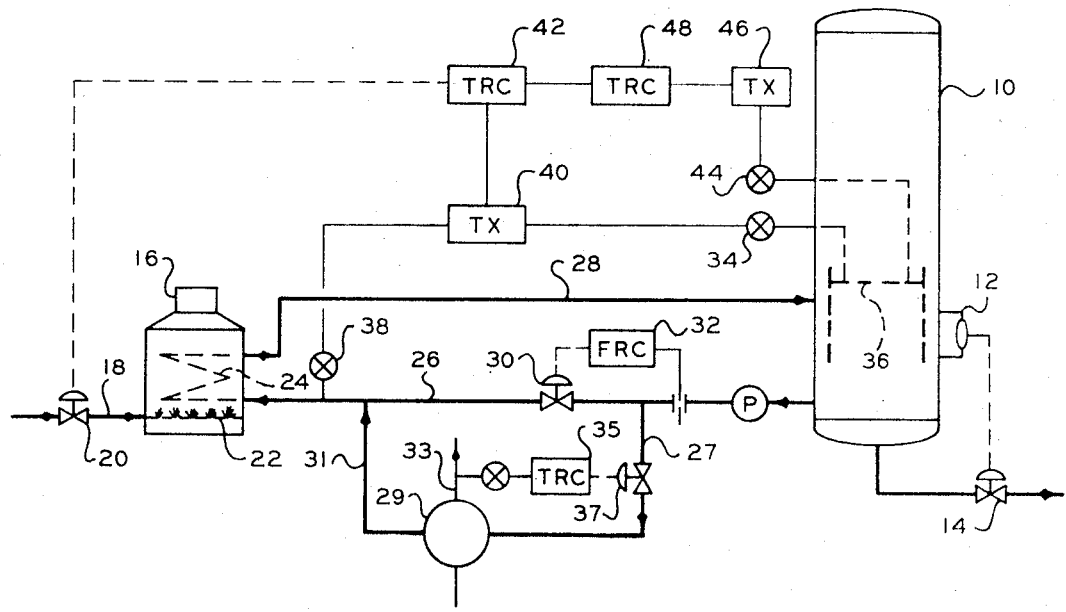

This invention relates to temperature control.

In many unit processes it is desirable to maintain a fluid in a processing zone or reaction zone substantially constant. This is frequently accomplished by withdrawing a stream of the fluid from said processing or reaction zone and passing same to a heat transfer zone wherein heat can be added to or extracted from said fluid. The temperature adjusted fluid is then returned to the first zone.

Temperature control systems wherein the temperature of a fluid in a processing or reaction zone is measured and said temperature measurement employed to control the heat added to or extracted from said fluid in a heat transfer zone are, in many instances, not satisfactory because there is too much lag in the system. Similarly, measurement of the temperature of a fluid before it enters or after it leaves a heat transfer system is frequently not satisfactory for controlling the temperature in a processing or reaction zone from which the fluid has been withdrawn. This is particularly true where the heat transfer zone is spaced apart from the reaction or processing zone, e.g., located a distance away from said processing or reaction zone. It is also particularly true when the fluid from the processing or reaction zone is circulated through a heat exchange system for heat exchange duty prior to entering the heat transfer zone where its temperature is to be adjusted. Again, there is too much lag or, in some instances, too great a difference between the temperature of the fluid leaving the processing or reaction zone and the temperature of the fluid prior to its entry into the heat transfer zone. In some instances, even without employing the fluid as a heat exchange medium, sudden changes in atmospheric temperature or a sudden rain squall can affect the processing or reaction system sufficient to lower the temperature therein and cause upsets in the temperature control system.

The present invention provides a solution for the above problems. We have discovered that by averaging the temperature of a fluid in a processing or reaction zone and the temperature of fluid from said zone prior to its entry into a heat transfer zone, and employing the average temperature as a control temperature, the above-described difficulties can be eliminated or at least mitigated. Thus, broadly speaking, the present invention comprises controlling and maintaining substantially constant the temperature of a fluid in a processing or reaction zone by employing, as a control temperature for a temperature adjustment zone, an averaged temperature obtained by averaging the temperature of said fluid in the processing or reaction zone and the temperature of said fluid prior to its entry into said temperature adjustment zone.

An object of this invention is to provide a method for minimizing lag in temperature control systems. Another object of this invention is to provide an apparatus for minimizing lag in temperature control systems. Another object of this invention is to provide a method for controlling and maintaining substantially constant the temperature of a fluid in a system wherein heat is added to said system. Another object of this invention is to provide a method for controlling and maintaining substantially constant the temperature in a system wherein heat is extracted from the system. Another object of this invention is to provide an improved method for the operation of a fractional distillation column. Another object of this invention is to provide a combination of apparatus for controlling the operation of a fractional distillation column. Another object of this invention is to provide a method for controlling the temperature in a reactor wherein heat is added to or removed from said reactor. Another object of this invention is to provide an apparatus for controlling the temperature in a reactor wherein heat is added to or removed from said reactor. Other aspects, objects, and advantages of the invention will be apparent to those skilled in the art in view of this disclosure.

Thus, according to the invention, there is provided a method for maintaining the temperature of a fluid in a first zone substantially constant, which method comprises: making a first measurement of the temperature of said fluid; passing a stream of said fluid from said first zone into a second zone; making a second measurement of the temperature of said fluid prior to its entry into said second zone; in said second zone, adjusting the temperature of said fluid by one of (a) addition of heat thereto and (b) extraction of heat therefrom; averaging said first and second temperature measurements to obtain an averaged temperature; controlling one of (c) the amount of heat added to said second zone and to said fluid therein and (d) the amount of heat extracted from said second zone and from said fluid therein in accordance with said averaged temperature; and returning said temperature adjusted fluid from said second zone to said first zone.

Further according to the invention, there is provided apparatus for maintaining the temperature of a fluid in a vessel substantially constant, said apparatus comprising, in combination: a vessel for containing said fluid; a first heat transfer means; first conduit means for passing fluid from said vessel to said first heat transfer means; means for making a first measurement of the temperature of said fluid in said vessel and emitting a first signal related thereto; means disposed in said first conduit adjacent said first heat transfer means for making a second measurement of the temperature of said fluid and emitting a second signal related thereto; means for averaging said first signal and said second signal to produce an averaged signal; means for one of (a) supplying heat to said first heat transfer means and (b) removing heat from said heat transfer means; control means responsive to said averaged signal for controlling one of (c) said means for supplying heat to said first heat transfer means and (d) said means for removing heat from said first heat transfer means; and second conduit means for returning temperature adjusted fluid from said first heat transfer means to said vessel.

Figure 2:
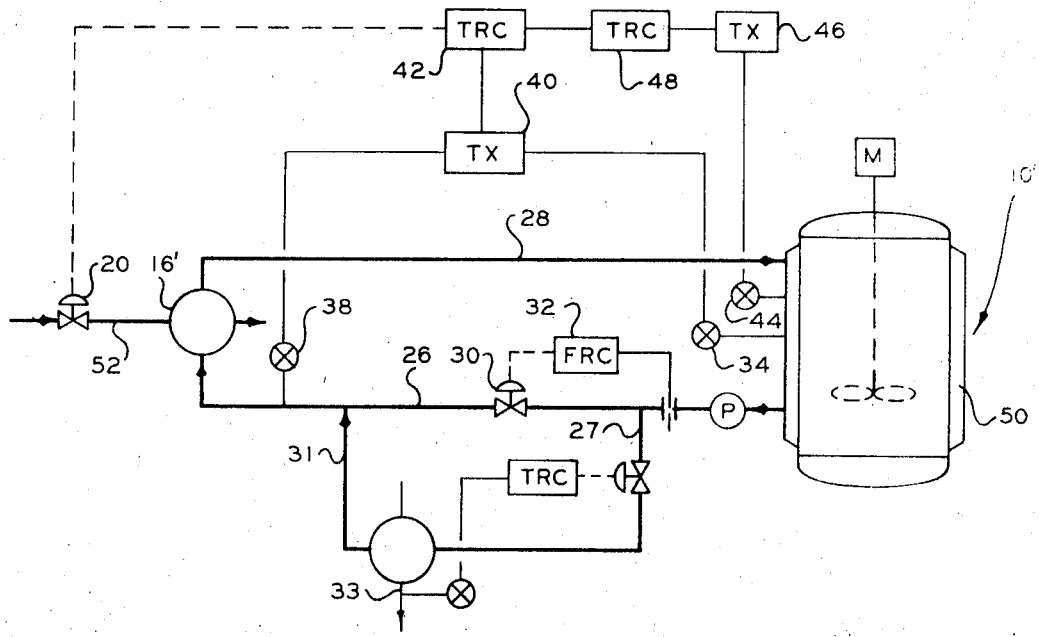

FIGURES 1 and 2 are diagrammatic drawings illustrating various embodiments of the invention.

Referring now to said drawings, wherein like reference numerals are employed to denote like elements, the invention will be more fully explained. In FIGURE 1, there is illustrated a vessel 10 which comprises a fractional distillation tower. A level of liquid is maintained in the bottom of said tower, as indicated, by means of level controller 12 and valve 14. A first heat transfer means 16 comprising a reboiler furnace is located a distance spaced apart from said tower 10. Said reboiler furnace is provided with means for supplying heat to the coil 24 therein which means comprises a fuel conduit 18, a valve 20 disposed in said fuel conduit, and a fuel burner 22. A first conduit means 26 connects the lower portion of said fractionating column 10 and said first heat transfer means 16, and is employed for passing liquid from said fractionating column into said coil 24. The heated liquid is returned to said column via second conduit means 28. Valve 30 controlled by flow recorder controller 32 in known manner can be employed for maintaining the flow of liquid through conduits 26 and 28 substantially constant. It is frequently desirable to employ the heated liquid from the bottom of tower 10 as a heat exchange medium to heat or cool other streams being processed in the plant. When this is desired a portion of the liquid being passed through conduit 26 can be diverted through conduit 27, heat exchanger 29, and returned via conduit 31 to said conduit 26. The fluid being heated or cooled is passed through said heat exchanger 29 by means of conduit 33. Temperature recorder controller 35, actuated in known manner responsive to the temperature of the fluid in conduit 33, controls the operation of valve 37 to regulate the amount of liquid being transfererd through conduit 27.

Temperature sensing means 34 is provided for making a first measurement of the temperature of the liquid in fractionating column 10. Said temperature sensing means 34 can comprise a conventional thermocouple or any other suitable temperature sensing means. While the temperature sensing means 34 is shown as extending into the column and measuring the temperature of the liquid on the first or lowermost tray 36 of column 10, the invention is not limited to taking the first measurement of the liquid in column 10 at this location. Said first temperature measurement can be taken at any suitable location within the column which is to be used as a control point, e.g., the liquid in the kettle or bottom of the tower or another tray higher up in the tower. It is also clearly within the scope of the invention to take said first temperature measurement in conduit 26 shortly after the liquid has been withdrawn from tower 10. Taking said first temperature on said tray 36 is presently preferred in some instances because of convenience and/or increased efficiency. The smaller amount of liquid on the tray, as compared to that in the bottom of the tower, will usually result in faster, more accurate control.

Another temperature sensing means 38 is disposed in said first conduit means 26 adjacent heat transfer means 16. Preferably, said second temperature sensing means is disposed in conduit 26 at a point to measure the temperature of the liquid therein just prior to its entry into heat transfer means 16. When a portion of the liquid in conduit 26 is diverted through a heat exchanging means via conduits 27 and 31 as described above, said second temperature sensing means 38 should be located downstream from said conduit 31.

In the system illustrated, the signal produced by first temperature sensing means 34 is related, e.g., proportional, to the temperature of the liquid on tray 36. The signal produced by second temperature sensing means 38 is related, e.g., proportional, to the temperature of the liquid in conduit 26. Said signals are transmitted to transducer 40 by means of the lead lines indicated. In transducer 40 the positive leads from sensing means 34 and 38 are connected to a common terminal and the negative leads from said temperature sensing means are connected to a common terminal. When the positive and negative lead wires from two temperature sensing means (e.g., thermocouples) are thus connected to respective common terminals, the signal or EMF measured across said two common terminals will be the average of the signals or EMF produced by the two temperature sensing means, e.g., 34 and 38. Said averaged temperature measurement or averaged signal from transducer 40 is passed to temperature recorder controller 42. Said temperature recorder controller 42 emits a signal related, e.g., inversely proportional, to said averaged signal received from transducer 40. The signal from temperature recorder controller 42 is employed to control the operation of motor valve 20 in fuel conduit 18, the motor in said valve being responsive to said signal.

A third temperature sensing means 44 is shown extending into the liquid on tray 36. This temperature sensing means is preferably employed to make an independent temperature measurement at substantially the same location as first temperature sensing means 34. The signal from sensing means 44 is related, e.g., proportional, to the temperature of the liquid on tray 36. Said signal is passed to transducer 46. Said transducer 46 produces a signal which is related, e.g., proportional, to the signal which it received and passes same to temperature recorder controller 48. Said TRC 48 produces a signal which is related, e.g., inversely proportional, to the signal which it received from transducer 46. The signal from temperature recorder controller 48 is employed to reset temperature recorder controller 42.

In one preferred method of operating the apparatus illustrated in FIGURE 1, a stream of the liquid in the bottom of tower 10 is withdrawn and passed via conduit 26 into first heat transfer means 16. A first measurement of the temperature of the liquid on tray 36 in tower 10 is made by means of temperature sensing means 34. A second measurement of the temperature of said liquid is made by means of temperature sensing means 38 just prior to the entry of the liquid into heat transfer means 16. The temperature of the withdrawn liquid is increased in heat transfer means 16 by the addition of heat thereto from fuel burned in burner 22. The temperature measurements made by temperature sensing means 34 and 38 are averaged and the averaged temperature is employed to control the operation of valve 20 in fuel conduit 18 supplying burner 22. The above operation including said temperature measurements, averaging of said temperature measurements, and the control of valve 20 can be accomplished "manually" by an operator. Said operations can also be accomplished automatically by passing a signal from transducer 40 which is an averaged signal related to the average of the signals produced by said temperature measurements to temperature recorder controller 42. Said temperature recorder controller 42 then emits a signal to valve 20 and controls the operation thereof.

In another sometimes more preferred method of operation temperature sensor 44 is employed to provide a quick correction for sudden abnormal changes in operating conditions in fractionating tower 10. For example, an increase in the feed rate of feedstock to the tower will make it necesary to add more heat to the tower in order to maintain the bottom tower temperature at its specified operating value. Conversely, a decrease in the feed rate to the tower will make it necessary to decrease the amount of heat introduced to the bottom of the tower. Similarly, an increase in the amount of reflux or a decrease in the temperature of the reflux being supplied to the top of the tower will require the input of more heat to the bottom of the tower. These abnormal changes will affect the temperature of the liquid on tray 36 and in the bottom of the tower. In such instances, temperature sensor 34 will sense the change in temperature and start correcting for same by the averaging process described above. However, we have found that employing a second temperature sensor 44 to make a temperature measurement independent of temperature sensor 34, and to produce a signal related, e.g., proportional, to the sudden abnormal change will more quickly correct for said abnormal change. Thus, the signal from temperature sensor 44 is passed to transducer 46 and then to temperature recorder controller 48. The signal from said temperature recorder controller 48 will reset temperature recorder controller 42 and thus more quickly change the position of valve 20. This change in the position of valve 20 could be made manually by an operator after observing the change in temperature of the liquid on tray 36. However, the automatic system described above is much preferred.

Similarly, when there is an abnormal change in the heat load in heat exchanger 29, e.g., the temperature in conduit 31 is abnormally low or high, temperature sensing means 38 will start the correction as described above. Then when the heat corrected fluid from conduit 28 reaches the tower, temperature sensing means 44 will detect the change and make a further correction.

If desired, one temperature sensing means 34 can be employed and the signal therefrom sent to transducer 46 as well as to transducer 40. However, the use of two temperature sensing means as illustrated is preferred. When only one temperature sensing means is employed, it will frequently be necessary to amplify the signal therefrom if it is employed at more than one transducer. It is usually more economical to employ two temperature sensing means. Furthermore, the two temperature sensing means will serve to check each other.

In FIGURE 2, there is illustrated a system wherein heat is extracted from a fluid. In FIGURE 2, there is illustrated a vessel 10' which comprises a reactor surrounded by a jacket 50 through which a cooled liquid, e.g., brine, is circulated to maintain the contents of reactor 10' substantially constant by extracting the heat of reaction therefrom. Thus, in the system illustrated in FIG. 2, heat transfer means 16' comprises a heat exchanger provided with means for passing a refrigerant, such as propane, therethrough by means of conduit 52. Said refrigerant is employed in conventional manner. The remainder of the elements of apparatus shown in FIGURE 2 are like those illustrated in FIGURE 1.

Thus, in one method of operating the apparatus of FIGURE 2, a cooling liquid, such as brine, is withdrawn from jacket 50, passed via conduit 26 to heat transfer means 16', and returned via conduit 28 to said jacket 50. The average of the temperature measurements from temperature sensing means 34 and 38 is employed to control the amount of heat extracted from the brine in heat transfer means 16' and thus control the temperature of the brine in jacket 50, similarly as described above in connection with controlling the temperature of liquid on tray 36 in FIGURE 1. The liquid being passed via conduit 33 is cooled instead of being heated as in FIGURE 1. While the apparatus illustrated in FIGURE 2 has been described as a cooling means, it can also be used in a heating system when it is desired to add heat to the contents of vessel 10'.

The following example will serve to further illustrate the invention.

EXAMPLE

Fractional distillation tower 10 is being operated as a dehexanizer to dehexanize a feed stream in a natural gasoline plant operation. Said feed stream is charged (via conduit means not shown) to said tower in conventional manner at a given predetermined feed rate and temperature. The top of said tower (not shown) is refluxed in conventional manner with 43 gallons per minute of reflux liquid consisting essentially of condensate from the tower overhead make stream. In normal operations of the tower said reflux maintains a top tower temperature of about 212° F. Normal operating temperature for the bottom of the tower is 494° F. A bottoms product stream is removed from said tower at a rate of 167 gallons per minute. In order to maintain said bottom tower temperature, 1,732 gallons per minute of liquid from the bottom of the tower is withdrawn via conduit 26 and circulated through heat transfer means or reboiler 16 and returned to said tower via conduit 28 as described above.

The above operating conditions in tower 10 are maintained within specified operating ranges by the operation of the temperature sensors 34 and 38, the averaged signal from transducer 40, and the signal from temperature recorder controller 42 to control valve 20. This control system of the invention will usually maintain the bottom tower temperature at the specified temperature, e.g., 494° F.±3° F. However, due to a sudden rain squall which decreases the ambient temperature the temperature of the reflux being supplied to the top of the tower decreases and the top tower temperature decreases to about 182° F. This, in turn, causes a decrease in the temperature on tray 36. This decrease in temperature on tray 36 is sensed or measured by temperature sensor 44 which passes a signal to transducer 46 and temperature recorder controller 48 as described above. The signal from temperature recorder controller 48 resets temperature recorder controller 42 to increase the amount of gas being supplied to furnace 16 and thus restore the bottom tower temperature to its operating temperature of 494° F. This preferred control system of the invention will usually maintain the bottom tower temperature at its specified temperature, ±0.5° F.

It will be recognized by those skilled in the art that the drawing is diagrammatic and many conventional items of equipment commonly used in a plant are not shown, e.g., pumps, valves, etc., and the necessary additional equipment can be supplied by one skilled in the art, when needed.

In said drawings the instrument or control systems there illustrated are preferably combinations of electrical instruments and pneumatic instruments. For example, the signals from temperature sensors 34, 38, and 44 are electrical. Transducers 40 and 46 convert said electrical signals to pneumatic signals which are passed to temperature recorder controllers 42 and 48, respectively. The signal from temperature recorder controller 42 to valve 20 is also pneumatic. However, as will be recognized by those skilled in the art, instruments are known and commercially available for making said system substantially all pneumatic or substantially all electrical. The use of such instruments is within the scope of the invention. Those skilled in the art will recognize that all the various elements of apparatus illustrated in the drawings and described herein are conventional and commercially available. Thus, the invention does not reside in employing the individual elements of apparatus per se. The invention resides in the various combinations of apparatus elements, and the various combinations of operating steps, described herein; to obtain the unitary improved results described herein.

While the invention has been described with particular reference to processes wherein the temperature of liquid is controlled, the invention is applicable to processes wherein it is desired to effect temperature control of vapors.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:

1. A method for maintaining the temperature of a fluid in a first processing zone substantially constant, which method comprises: making a first measurement of the temperature of said fluid; passing a stream of said fluid from said first zone into a second zone spaced apart from said first zone, said second zone being a heat transfer zone; making a second measurement of the temperature of said fluid after its removal from said first zone and just prior to its entry into said second zone; in said second zone, adjusting the temperature of said fluid by one of (a) addition of heat thereto and (b) extraction of heat therefrom; averaging said first and second temperature measurements to obtain an averaged temperature; controlling one of (c) the amount of heat added to said second zone and to said fluid therein and (d) the amount of heat extracted from said second zone and from said fluid therein in accordance with said averaged temperature; and returning said temperature adjusted fluid from said second zone to said first zone.

2. A method according to claim 1 wherein: said second zone is a heating zone; heat is supplied to said second zone to heat said fluid therein; the amount of heat supplied to said second zone is controlled in accordance with said averaged temperature; and heated fluid is returned to said first zone.

3. A method according to claim 2 wherein: said first zone comprises a fractional distillation column; said fluid comprises a liquid hydrocarbon and is withdrawn from the lower portion of said column; said second zone comprises a reboiler furnace which is heated by combustion of a fuel therein; and the amount of heat supplied to said furnace is controlled by adjusting the amount of fuel supplied thereto in accordance with said averaged temperature.

4. A method according to claim 2 wherein: said first zone comprises a fractional distillation column; said fluid comprises a liquid hydrocarbon and is withdrawn from the lower portion of said column; said second zone comprises a heat exchange zone which is heated by supplying a hot heat exchange medium thereto; and the amount of heat supplied to said second zone is controlled by adjusting the amount of said heat exchange medium flowing thereto in accordance with said averaged temperature.

5. A method according to claim 4 wherein said heat exchange medium is steam.

6. A method according to claim 1 wherein: said first temperature measurement produces a first signal related thereto; said second temperature measurement produces a second signal related thereto; said first and second signals are averaged to obtain an averaged signal; and the amount of heat added to or extracted from said second zone is controlled responsive to said averaged signal.

7. A method according to claim 6 wherein: a third measurement of the temperature of said fluid is made within said first zone and produces a third signal related thereto; and the amount of heat added to or extracted from said second zone responsive to said averaged signal is adjusted responsive to said third signal.

8. A method according to claim 1 wherein: said second zone is a cooling zone; heat is extracted from said second zone to cool said fluid therein; the amount of heat extracted from said second zone is controlled in accordance with said averaged temperature; and cooled fluid is returned to said first zone.

9. Apparatus for maintaining the temperature of a fluid in a vessel substantially constant, said apparatus comprising, in combination: a vessel for containing said fluid; a first heat transfer means spaced apart from said vessel; first conduit means for passing fluid from said vessel to said first heat transfer means; means for making a first measurement of the temperature of said fluid in said vessel and emitting a first signal related thereto; means disposed in said first conduit adjacent said first heat transfer means for making a second measurement of the temperature of said fluid after removal of said fluid from said vessel and just prior to its entry into said heat transfer means, and emitting a second signal related to said second measurement; means for averaging said first signal and said second signal to produce an averaged signal; means for one of (a) supplying heat to said first heat transfer means and (b) removing heat from said first heat transfer means; control means responsive to said averaged signal for controlling one of (c) said means for supplying heat to said first heat transfer means and (d) said means for removing heat from said first heat transfer means; and second conduit means for returning temperature adjusted fluid from said first heat transfer means to said vessel.

10. Apparatus according to claim 9 wherein: said vessel comprises a fractional distillation tower; said first heat transfer means comprises a reboiler furnace; said means for supplying heat to said furnace comprises a fuel conduit, a valve in said fuel conduit, and a fuel burner; and said control means which is responsive to said averaged signal controls the operation of said valve.

11. Apparatus according to claim 10 comprising, in further combination: a third means for making a measurement of the temperature of said fluid in said tower and emitting a third signal proportional thereto; and means responsive to said third signal for resetting said control means which is responsive to said averaged signal.

12. Apparatus according to claim 9 wherein: said first heat transfer means comprises a heat exchanger; said means for supplying heat to or removing heat from said heat exchanger comprises a heat exchange medium conduit, and a valve in said heat exchange medium conduit; and said control means which is responsive to said averaged signal controls the operation of said valve.

References Cited
UNITED STATES PATENTS

| | | | |
|---|---|---|---|
| 2,572,253 | 10/1951 | Fellows et al. | 236—23 |
| 2,684,326 | 7/1954 | Boyd | 203—2 |
| 2,725,351 | 11/1955 | Grote | 202—160 |
| 2,788,264 | 4/1957 | Bremer et al. | 196—132 |
| 2,965,549 | 12/1960 | Hudkins | 203—2 |
| 2,974,182 | 3/1961 | Van Pool | 196—132 |
| 3,097,836 | 7/1963 | Beggs et al. | 165—39 |
| 3,223,749 | 12/1965 | Van Pool et al. | 196—132 |
| 3,249,519 | 5/1966 | Cabbage et al. | 203—2 |
| 3,269,921 | 8/1966 | Oglesby et al. | 203—2 |
| 3,296,121 | 1/1967 | Potts. | |

WILBUR L. BASCOM, Jr., Primary Examiner

U.S. Cl. X.R.

55—20, 163; 62—21; 137—2; 159—44; 165—39; 196—132; 202—160, 206; 236—23